July 31, 1962 R. C. MARCH 3,047,658

TELEVISION TRANSMITTER SYNCHRONIZATION
BY REMOTE SYNCHRONIZING SOURCE

Filed Nov. 12, 1959 4 Sheets-Sheet 1

INVENTOR
Roy Collins March
BY
Baldwin & Wight
ATTORNEYS

July 31, 1962 R. C. MARCH 3,047,658

TELEVISION TRANSMITTER SYNCHRONIZATION BY REMOTE SYNCHRONIZING SOURCE

Filed Nov. 12, 1959 4 Sheets-Sheet 2

INVENTOR
Roy Collins March
BY
Baldwin & Wight
ATTORNEYS

July 31, 1962

R. C. MARCH 3,047,658

TELEVISION TRANSMITTER SYNCHRONIZATION
BY REMOTE SYNCHRONIZING SOURCE

Filed Nov. 12, 1959

4 Sheets-Sheet 3

INVENTOR
Ray Collins March
BY
Baldwin & Wight
ATTORNEY

July 31, 1962 R. C. MARCH 3,047,658

TELEVISION TRANSMITTER SYNCHRONIZATION
BY REMOTE SYNCHRONIZING SOURCE

Filed Nov. 12, 1959 4 Sheets-Sheet 4

INVENTOR
Roy Collins March
BY Baldwin & Wight
ATTORNEYS

United States Patent Office 3,047,658
Patented July 31, 1962

3,047,658
TELEVISION TRANSMITTER SYNCHRONIZATION BY REMOTE SYNCHRONIZING SOURCE
Roy Collins March, Chelmsford, England, assignor to Marconi's Wireless Telegraph Company Limited, London, England, a company of Great Britain
Filed Nov. 12, 1959, Ser. No. 852,371
Claims priority, application Great Britain Dec. 5, 1958
7 Claims. (Cl. 178—69.5)

Figure 1:
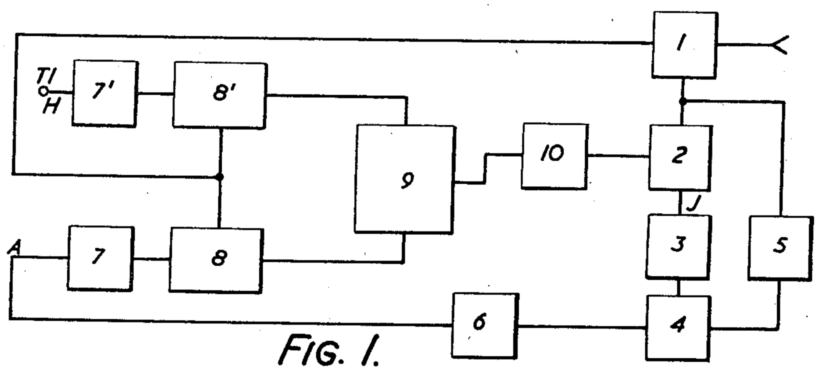

This invention relates to television systems and more specifically to television field phase controlling systems for automatically controlling the times of occurrence of field synchronising pulses produced by a source of such pulses to maintain those times automatically and with precision in accordance with the times of occurrence of field synchronising pulses present in a controlling waveform. This requirement commonly arises where a television transmitter, having the usual local means for providing a line and field synchronising waveform, must be synchronised, both as regards line and field pulses in that waveform, with the corresponding pulses in a waveform fed in from some remote point—e.g. an outside studio. There is, in general, no difficulty in securing synchronism of the line pulses but, if the channel from the outside studio is subjected to interference—as it commonly is—or if the transmitter is switched over from receiving signals from one outside studio to receiving signals from another, there is difficulty in ensuring that the field pulses do not get out of step with one another. The present invention seeks to overcome this difficulty by simple and reliable means which will automatically restore the in-step condition if it be lost, do so gradually at a required speed (or, if desired, at any of a number of pre-chosen desired speeds), and do so without requiring any manual adjustments in operation. Though not limited to its application thereto, the invention is well adapted for use in interlaced scanning television systems where it has the advantage of operating without risk of disturbing the interlacing.

According to this invention a television field phase controlling arrangement adapted automatically to control the phase of the field pulses in a locally produced synchronising waveform, including field and line pulses, to be in step with the field pulses in a controlling externally produced waveform, also including field and line pulses, comprises means, synchronised by the line pulses in said externally produced waveform, for providing triggering pulses at line frequency or a multiple thereof, means, controlled by said triggering pulses, for providing the line pulses in the locally produced waveform, means, including a counter chain to which pulses, including triggering pulses, are supplied, for providing a field pulse in the locally produced waveform each time a predetermined number of pulses has been counted by said counter chain, means for initiating a pulse by each field pulse in the externally produced waveform, means for initiating a pulse by each field pulse in the locally produced waveform and means, responsive to phase difference between the initiated pulses, for changing the number of pulses supplied to the counter chain and thereby restoring and maintaining the in-phase condition.

In the case of a double-interlaced television system the aforesaid triggering pulses have a repetition frequency of twice the line frequency.

In one way of carrying out the invention the pulse initiated by each field pulse in the externally produced waveform is of predetermined length, the pulse initiated by each field pulse in the locally produced waveform is of substantially the same length and the means responsive to the phase difference between the initiated pulses are arranged to cut off the supply of triggering pulses to the counter chain.

In applying this way of carrying out the invention to a double-interlaced television system in which the synchronising waveform includes a short series of pulses, there being one such series for each field, each pulse being longer than a line synchronising pulse and occurring at twice the line frequency, each of said series in both the locally produced and the externally produced waveforms, is utilised to provide an integrated elongated pulse extending substantially for the duration of said series and the pulse initiating means are initiated by corresponding edges of said elongated pulses.

In those embodiments of the invention in which the required in-phase condition is restored by cutting off the supply of triggering pulses to the counter chain, the means for doing this may comprise means for generating a correcting pulse whose length is of predetermined value or is determined in dependence upon the time interval between said initiated pulses, whichever is the shorter, and gating means, actuated by said correcting pulse for cutting off the supply of said triggering pulses to the counter chain. In one embodiment of this nature, for use in a double-interlaced television system, said correcting pulse generating means is constituted by a mono-stable multivibrator adapted to commence a pulse on reception of one of said initiated pulses derived from the locally produced waveform and to end the pulse after a predetermined time or on reception, within said predetermined time, of one of said initiated pulses derived from the externally produced waveform, the length of said correcting pulse in the former case being substantially equal to an even number of periods of said triggering pulses. Between the multivibrator and the aforesaid gating means there is preferably interposed a noise suppressor circuit adapted effectively to short circuit the first few of a series of correcting pulses, whereby an isolated pulse, generated by noise is rendered ineffective.

In another and preferred way of carrying out the invention, the operation of the means, responsive to phase difference between the initiated pulses, for changing the number of pulses supplied to the counter, is automatically dependent upon the sense of the phase difference, being arranged to cut off the supply of triggering pulses to the counter if one of the initiated pulses is in advance of the other and to add additional pulses to the triggering pulses supplied to the counter if said one initiated pulse is delayed with respect to the other.

A preferred embodiment of this nature includes a rectangular wave generator controlled by the externally produced waveform and arranged to produce a wave at the field frequency; means for deriving voltage peaks at field frequency from said rectangular wave; a multivibrator subjected to joint control by said voltage peaks and by signals occurring at field frequency and derived from the locally produced waveform; means for producing delayed triggering pulses, and gating switch means, jointly controlled by pulses from the multivibrator and the rectangular wave for adding the delayed pulses to the triggering pulses supplied to the counter chain when a multivibrator pulse occurs during a half rectangular wave of one predetermined polarity and cutting off the supply of triggering pulses to the counter chain when a multivibrator pulse occurs during a half rectangular wave of the opposite polarity.

The invention is illustrated in and further explained in connection with the accompanying drawings.

Figure 2:
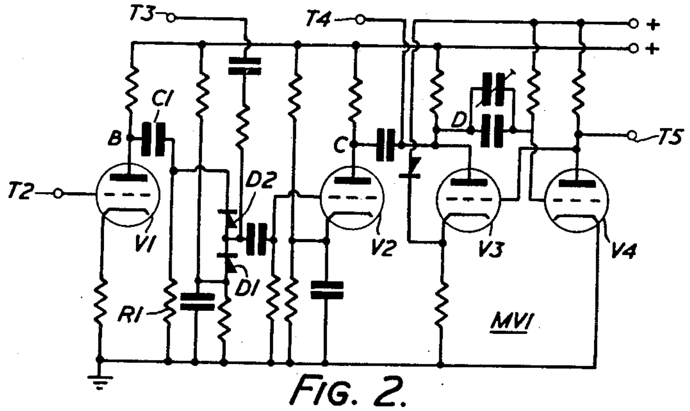
Figure 3:
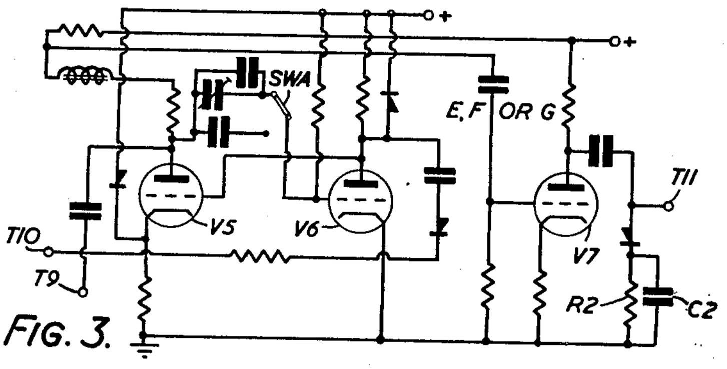
Figure 4:
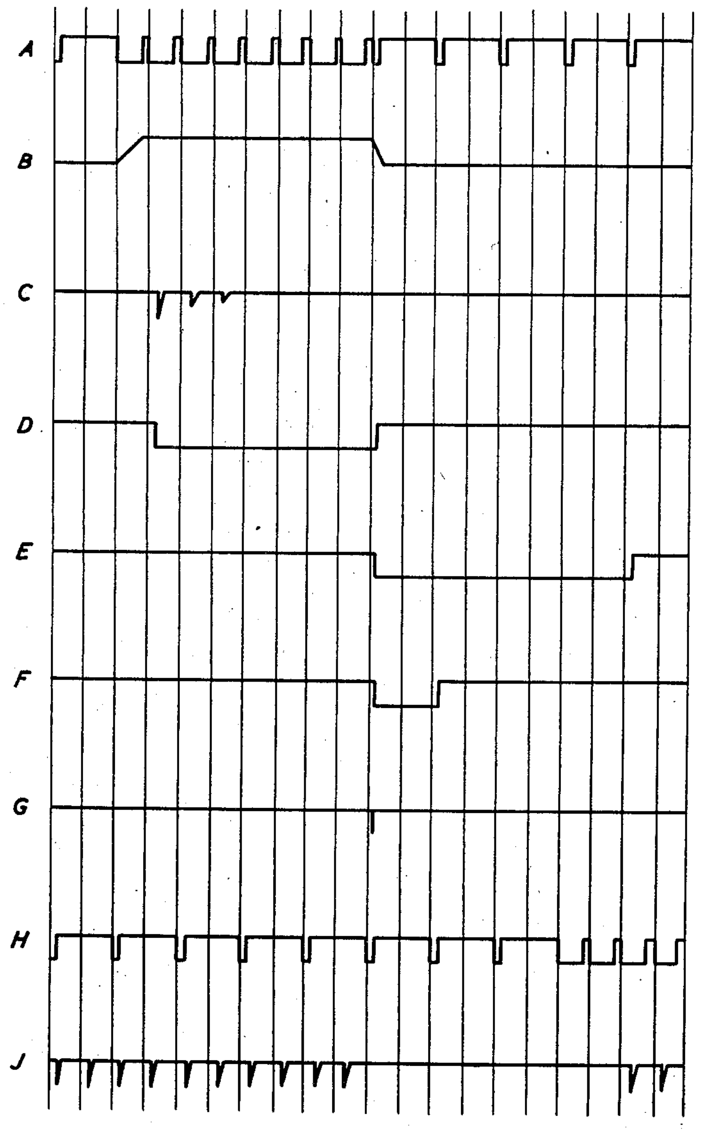
Figure 5:
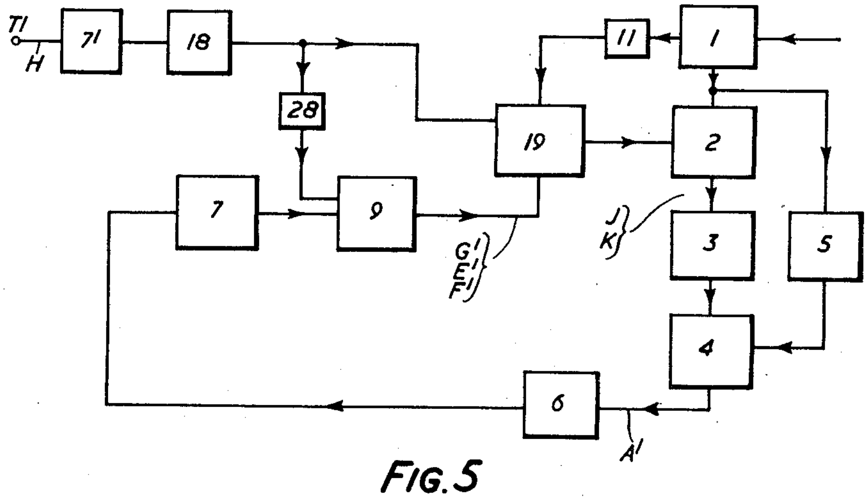
Figure 6:
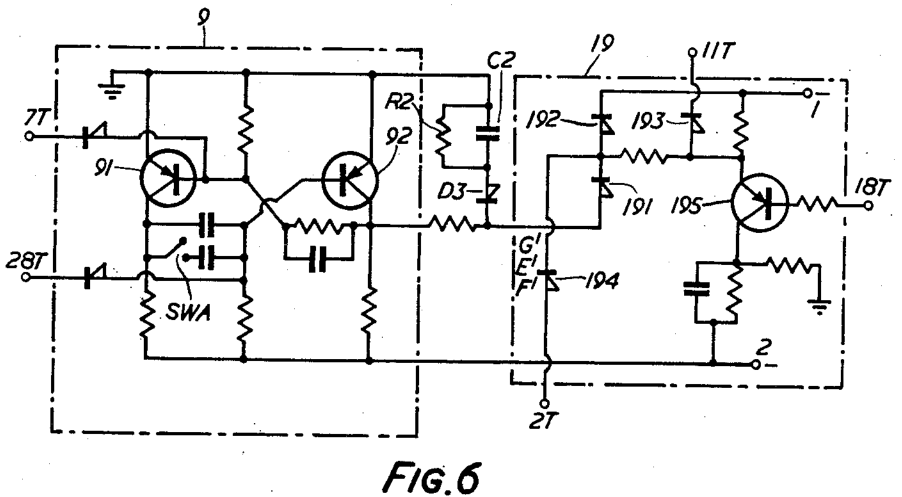
Figure 7:
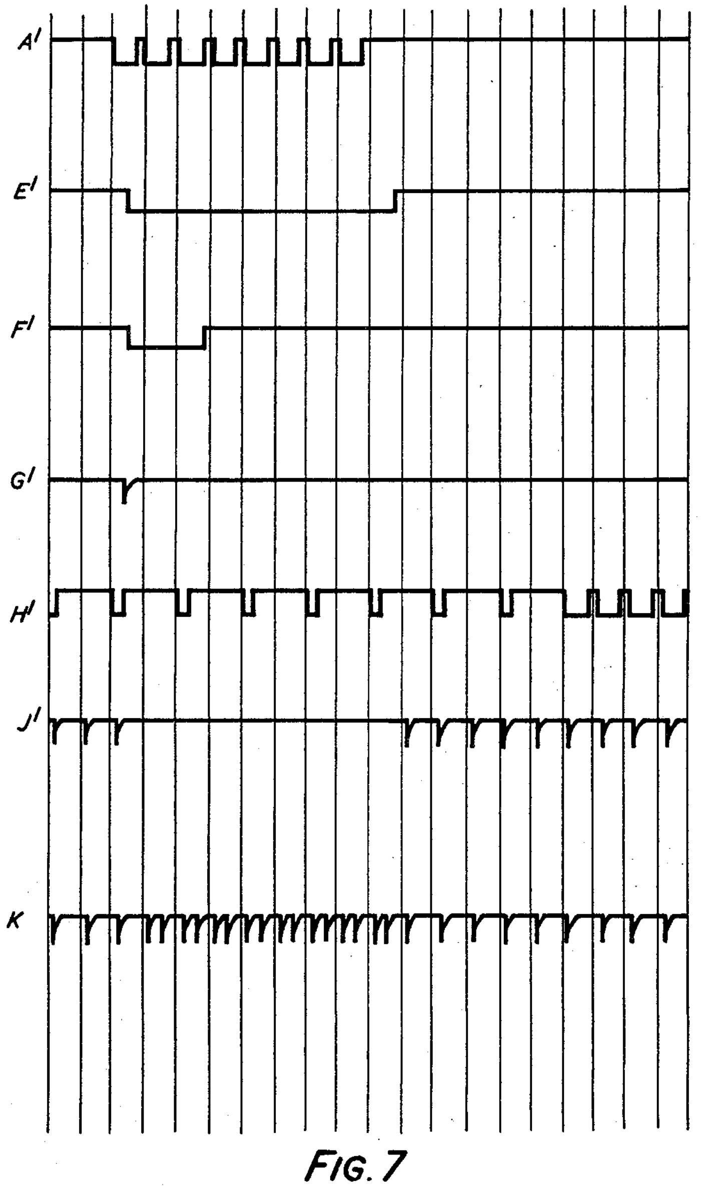

In the drawing, FIG. 1 is a schematic diagram of one embodiment of the invention for use with television systems employing present-day British television standards; FIG. 2 is a circuit diagram of one of the units of the embodiment of FIG. 1; FIG. 3 is a circuit diagram of another of the units of the embodiment of FIG. 1; FIG. 4 is an idealised graphical representation of the wave-forms occurring at different points in the embodiment of FIG. 1; FIG. 5 is a schematic diagram of a preferred embodiment also for use with television systems employing present-day British television standards; FIG. 6 is a circuit diagram of certain of the units in the embodiment of FIG. 5; and FIG. 7 is a graphical representation, like that of FIG. 4, but related to FIGS. 5 and 6. The reference letters applied to the waveforms of FIG. 4 are also shown in FIGS. 1, 2 and 3 at the points at which these waveforms occur, and similarly, reference letters in FIG. 7 also appear in FIG. 5.

Referring to FIGURES 1 to 4 inclusive, unit 1 is a pulse generator producing triggering pulses at twice the line frequency, these pulses being synchronised, as is indicated by the arrowhead, by the line pulses in a remotely produced television synchronising waveform in well-known manner. These triggering pulses are passed, except as will hereinafter be described, by a gate 2 to a counter chain 3, which is adapted to produce one output pulse for every 405 input pulses. The output pulses from counter chain 3 are then fed to the local synchronising waveform generator 4 where they are used, in known manner, to provide the field synchronising pulses in the waveform derived therefrom. Triggering pulses from the pulse generator 1 are also fed to a second counter 5, which is adapted to produce one output pulse for every two input pulses, the output pulses being used to provide the line synchronising pulses in the waveform derived from the waveform generator 4. This waveform is then fed to the clipping amplifier 6, whose output waveform is shown at A in FIGURE 4. As so far described the system is well-known.

The waveform A is fed to an integrator 7 which may, for example, comprise a series resistance and shunt condenser, adapted to produce an elongated pulse from the long negative frame synchronising pulses of waveform A, but to produce substantially no output from the comparatively short negative line synchronising pulse. This integrated pulse is passed to the unit 8, whose circuit is shown in detail in FIGURE 2.

Referring to FIGURE 2, the integrated pulse is fed via terminal T2 to the grid of valve V1 which is arranged as a clipping amplifier. Triggering pulses from the pulse generator 1 are fed via terminal T3 to the junction of diodes D1 and D2 which, in the absence of a pulse at the anode of valve V1, are biased to be conducting. The clipped integrated pulse appearing at the anode of V1, waveform B in FIGURE 4, is differentiated by the circuit comprising condenser C1 and the resistance R1, and the resulting positive differentiated pulse cuts off the diodes D1 and D2, allowing the triggering pulses from the pulse generator 1, which had previously been effectively short circuited to earth through diode D1, to be applied to the grid of the amplifier V2. The differentiated pulse waveform is such that the first triggering pulse is passed to V2 at substantially full amplitude but succeeding pulses are sufficiently attenuated as to be relatively ineffective. The first triggering pulse is passed by the amplifier V2 and triggers the mono-stable multivibrator MV1, formed by valve V3 and V4 and their associated circuits. Such multivibrators are well known and require no further description here. The length of the pulse produced by the multivibrator MV1 is determined approximately by the circuit constants of the multivibrator, its length being precisely determined by the application of low amplitude triggering pulses from terminal T4, derive from the pulse generator 1 through a series connected condenser, to the anode of valve V3. This switching pulse from the multivibrator MV1, which is of the form shown at D in FIGURE 4 but of reverse polarity, is then fed via terminal T5 to the unit 9 of FIGURE 1.

Referring to FIGURE 1, the waveform which may be as shown at H in FIGURE 4, received from a remote synchronising waveform generator (not shown), is fed to terminal T1 of unit 7′, which is similar to unit 7, and thence to unit 8′, which is similar to unit 8 except for one small difference which will be described hereafter. The resulting switching pulse is again fed to unit 9, whose circuit is shown in detail in FIGURE 3.

Referring to FIGURE 3, the switching pulse from unit 8 is fed via terminal T9 to the anode of valve V5, which forms together with the valve V6 and their associated circuit, the mono-stable multivibrator MV2, and the switching pulse from unit 8′ is fed in the manner shown via terminal T10 to the anode of valve V6. The trailing edge of the switching pulse from unit 8 initiates a correcting pulse, provided waveforms A and H of FIGURE 4 are not in phase, whose length is determined by the circuit constants of the multivibrator or by the time interval between the trailing edge of the switching pulse from unit 8 and the trailing edge of the corresponding pulse, which is arranged to switch off the correcting pulse, from unit 8′, whichever is the shorter. With the waveform timings shown in FIGURE 4 the correcting pulse length is determined by the circuit constants. As shown in the drawings, a switch SWA is arranged to have two positions whereby different values of capacity may be switched into circuit to give two different lengths of correcting pulse from multivibrators MV2, and hence two speeds of correction. These different lengths of pulses are shown at E and F in FIGURE 4. The correcting pulse is then fed to the amplifier V7 and the resulting output fed via terminal T11 to the gate 2 of FIGURE 1.

Across the output circuit of amplifier V7 is connected a diode D3 in series with the resistance R2 and condenser C2 in parallel. The arrangement of this circuit is such that the first few correcting pulses from the amplifier V7 are attenuated, but serve to charge the condenser C2 and so cut-off the diode D3, allowing subsequent pulses to be passed to the gate 2. Thus isolated pulses generated by the multivibrator MV2 as a result, for example, of noise, will be rendered ineffective.

Referring to FIGURE 1 the correcting pulses from unit 9 are passed to cathode follower 10 and thence to the gate 2 where they are used to cancel a number if the triggering pulses fed from the pulse generator 1 to the counter chain 3 and hence correct the timing of the field synchronising pulses in the synchronising waveform from the waveform generator 4.

It will be seen that if the field synchronising pulses in the locally and remotely produced synchronising waveforms are initially in phase then corresponding pulses will be fed substantially simultaneously from units 8 and 8′ of FIGURE 1 and no correcting pulse will be obtained from MV2 of FIGURE 3. The danger exists, however, that if the switching pulse from unit 8′ is very slightly in advance of that from unit 8, then the pulse from unit 8 will trigger the multivibrator MV2 which will then produce a correcting pulse of length dependent on its circuit constants and correct phasing will be lost temporarily. This is prevented in the present embodiment by inserting a delay network, having a very short delay time, in the path of the low amplitude triggering pulses fed from the pulse generator 1 to the anode of one of the valves of the multivibrator in unit 8′, thus ensuring that the trailing edge of the switching pulse from unit 8′ is slightly delayed with respect to the trailing edge of the switching pulse from unit 8. When the field pulses in the two synchronising waveforms are now in phase the multivibrator MV2 will only produce an output spike, such as is shown at G in FIGURE 4, which is of insufficient duration to cause any cancellation of the triggering pulses fed to the counter chain 3.

In order to maintain the interlaced conditions it is necessary that the correcting pulse obtained from the multivibrator MV2 should be of such length, when its length is determined by its circuit constants, as to cancel an even number of triggering pulses in the gate 2. This is arranged by choosing the circuit constants of the multivibrator MV2 to be of such value that the length of pulse from the multivibrator, determined by these circuit constants, is substantially equal to an even number of periods of the triggering pulses from the pulse generator 1.

The preferred arrangement illustrated and described in connection with FIGURES 5, 6 and 7 has the advantage over that described in connection with FIGURES 1 to 4 inclusive that it is quicker in operation in restoring the required in-phase condition for, if the out-of-phase condition occurs, it will automatically either reduce the number of output pulses from unit 2 (as does the arrangement illustrated by FIGURES 1 to 4) or add extra pulses in tha output, whichever is, in the circumstances, the quicker way to restore the in-phase condition.

Referring to FIGURE 5, the units 1, 2, 3, 4, 5, 6, 7, 7' and 9 serve the same purposes as, and are similar to, the correspondingly referenced units of FIGURE 1 though, of course, their detail designs may be different, e.g. they may incorporate transistor circuits instead of valve circuit. The output taken from unit 4 to the clipper amplifier may be as shown at A in FIGURE 4, but is represented in FIGURE 7 as taken from a point in unit 4 where the line synchronising pulses are absent, i.e. it is as shown at A' in FIGURE 7.

The input at terminal T1 of FIGURE 5 is as shown at H in FIGURE 7 and, as will be seen, is the same as that applied at terminal T1 of FIGURE 1. This input controls a pulse generator 18, such as a multivibrator which gives a square wave output at the field frequency. The units 8 and 8' of FIGURE 1 are eliminated. This square wave output is fed to a differentiating circuit 28 which is arranged to produce an output consisting of peaks of voltage at the field frequency and each corresponding to a trigger impulse into the generator 18. Outputs from units 28 and 7 are fed to the unit 9 to control its operation in dependence upon the phase relation between them. The square wave output from unit 18 is also fed to what may be termed a switching gate unit 19 which also receives two other inputs, namely one from unit 9 and the other from a delay unit 11 which delays pulses taken from unit 1 by a small amount which is not very critical but which in practice may be about ¼th of the period of unit 1.

The operation of the unit 19 depends upon the condition in unit 9 which in turn depends upon the phase relationship of the outputs from units 7 and 28. In the correct in-phase relationship the output from unit 9 consists of short voltage peaks as shown at G' in FIGURE 7. The peaks, though passed on by unit 19 to unit 2 after a certain amount of attenuation in the circuits of unit 19, occur at such times and are of such amplitude as to produce no effect as regards the output supplied from unit 2 to unit 3.

If the output from unit 28 is delayed with respect to that from unit 7, the output from unit 9 will be either as shown at E' or as shown at F', depending upon the position of switch SWA of unit 9 (see FIGURE 6 to be described later) which serves the same purpose as the correspondingly referenced switch SWA of FIGURE 3. Whichever of these two outputs is obtained it is passed on to unit 2 by unit 19 and, during the existence of the negative going pulse of E' or F' (as the case may be), prevents unit 2 from passing pulses to unit 3. In other words pulses are omitted from the train fed to unit 3 much as with the embodiment of FIGURES 1, 2 and 3. Line J' of FIGURE 7 shows the output from unit 2 obtained in these conditions on the supposition that the output from unit 9 is as shown at E' in FIGURE 7.

If the output from unit 28 is advanced in time with respect to that from unit 7, unit 9 still produces output as shown at E' or F', depending upon the position of switch SWA. This output is not, however, now passed on to unit 2 but is used to control a gate through which delayed pulses from the line 11 are passed on to unit 2. During the existence of the pulse of E' or F' (as the case may be)

these additional delayed pulses from 11 are fed in to unit 2 whose output accordingly includes these additional pulses and is shown as at K in FIGURE 7 which, again, is drawn on the assumption that the output from unit 9 is as shown at E'. As will be seen from the said line K there are now no lost pulses but in each of the fourth to eleventh (inclusive) periods shown in FIGURE 7 there are pairs of pulses instead of single pulses, the second pulse of each pair corresponding to a delayed pulse fed to unit 2 through unit 19 from delay unit 11.

FIGURE 6 shows suitable transistor circuitry for units 9 and 19 and adapted to operate in the manner just described. Unit 9 comprises a multivibrator incorporating two transistors 91, 92, output from unit 7 being fed via terminal 7T to the base of transistor 91 and output from unit 28 being fed via terminal 28T to the base of transistor 92. The switch SWA enables either of two different lengths of pulse and therefore either of two correction speeds to be obtained just as does the switch SWA of FIGURE 3. The circuit comprising diode D3, resistance R2 and condenser C2 functions to render noise ineffective to interfere with correct operation just as does the circuit in FIGURE 3 including the correspondingly referenced elements D3, R2, C2.

Unit 19, also shown in FIGURE 6, includes diodes 191, 192, 193 and 194 and a transistor 195 connected as shown. Diodes 191 and 192 are normally conducting and diode 194 is normally cut off. Output from unit 11 is fed in at terminal 11T, output from unit 9 is fed in to diode 191, and output from unit 18 is fed in to the base of transistor 195 from terminal 18T. Output from unit 19 is taken at terminal 2T to unit 2. If a negative going pulse is fed in from unit 9 it will cut off diodes 191 and 192 while diode 193 will be cut off during negative half-waves from unit 18 and conductive during positive half waves from that unit. If, therefore, a negative pulse (such as at E' or F' in FIGURE 7) occurs from unit 9 while a negative half-wave is being supplied from unit 18, diode 193 will be cut off and the pulse will pass through diode 194 to unit 2 via terminal T2. If, however, when such a negative pulse is supplied by unit 9, a positive half-wave is being supplied by unit 18, diode 193 will be rendered conductive and delayed pulses at terminal 11T will pass through diodes 193 and 194 to unit 2. Suitable different negative D.C. potentials are applied at the terminals marked —1 and —2.

Although the invention has been described with reference to a television system employing British television standards it can equally be applied to systems employing other standards.

I claim:

1. A television field phase controlling arrangement adapted automatically to control the phase of the field pulses in a locally produced synchronising waveform, including field and line pulses, to be in step with the field pulses in a controlling externally produced waveform, also including field and line pulses, said arrangement comprising means, synchronised by the line pulses in said externally produced waveform, for providing triggering pulses at line frequency or a multiple thereof, means, controlled by said triggering pulses, for providing the line pulses in the locally produced waveform, means, including a counter chain to which pulses, including triggering pulses, are supplied, for providing a field pulse in the locally produced waveform each time a predetermined number of pulses has been counted by said counter chain, means for initiating a pulse of predetermined length by each field pulse in the externally produced waveform, means for initiating a pulse by each field pulse in the locally produced waveform, the initiated pulses being of substantially the same length as the pulses of predetermined length in the externally produced waveform and means, responsive to phase difference between the initiated pulses to cut off the supply of triggering pulses to the counter chain thereby changing the number of pulses supplied to the counter chain and restoring and maintaining the in-phase condition.

2. An arrangement as claimed in claim 1 for a double interlaced television system in which the synchronising waveform includes a short series of pulses, there being one such series for each field, each pulse being longer than a line synchronising pulse and occurring at twice the line frequency, said arrangement comprising means for utilising each of said series in both the locally produced and the externally produced waveforms to provide an integrated elongated pulse extending substantially for the duration of said series and means for initiating the pulse initiating means by corresponding edges of said elongated pulses.

3. An arrangement as claimed in claim 1 for a double interlaced television system wherein the said triggering pulses have a repetition frequency of twice the line frequency.

4. An arrangement as claimed in claim 3 wherein the operation of the means, responsive to phase difference between the initiated pulses, for changing the number of pulses supplied to the counter, is automatically dependent upon the sense of the phase difference, being arranged to cut off the supply of triggering pulses to the counter if one of the initiated pulses is in advance of the other and to add additional pulses to the triggering pulses supplied to the counter if said one initiated pulse is delayed with respect to the other.

5. An arrangement as claimed in claim 3 and including a rectangular wave generator controlled by the externally produced waveform and arranged to produce a wave at the field frequency; means for deriving voltage peaks at field frequency from said rectangular wave; a multivibrator subjected to joint control by said voltage peaks and by signals occurring at field frequency and derived from the locally produced waveform; means for producing delayed triggering pulses; and gating switch means, jointly controlled by pulses from the multivibrator and the rectangular wave for adding the delayed pulses to the triggering pulses supplied to the counter chain when a multivibrator pulse occurs during a half rectangular wave of one predetermined polarity and cutting off the supply of triggering pulses to the counter chain when a multivibrator pulse occurs during a half rectangular wave of the opposite polarity.

6. An arrangement as claimed in claim 3 including means for generating a correcting pulse whose length is of predetermined value or is determined in dependence upon the time interval between said initiated pulses, whichever is the shorter, and gating means, actuated by said correcting pulse for cutting off the supply of said triggering pulses to the counter chain.

7. An arrangement as claimed in claim 6 wherein said correcting pulse generating means is constituted by a mono-stable multivibrator adapted to commence a pulse on reception of one of said initiated pulses derived from the locally produced waveform and to end the pulse after a predetermined time or on reception, within said predetermined time, of one of said initiated pulses derived from the externally produced waveform, the length of said correcting pulse in the former case being substantially equal to an even number of periods of said triggering pulses.

References Cited in the file of this patent

UNITED STATES PATENTS

| | | |
|---|---|---|
| 2,570,775 | DeBaun | Oct. 9, 1951 |
| 2,704,307 | Gillette et al. | Mar. 15, 1955 |
| 2,720,555 | Krause | Oct. 11, 1955 |